Patented Dec. 4, 1951

2,577,191

UNITED STATES PATENT OFFICE 2,577,191

FORMALDIMINES AND THEIR REACTION PRODUCTS

Howard D. Hartough, Pitman, N. J., assignor to Socony-Vacuum Oil Company, Incorporated, a corporation of New York No Drawing. Application October 29, 1947, Serial No. 782,962

8 Claims. (Cl. 260—329)

The present invention relates to the preparation of formaldimines and, more particularly, to the preparation of thenylformaldimines.

It was found in mixing formaldehyde and ammonium chloride solutions, the pH of each of which is about 6, that the pH immediately changed from 6 to less than 2, indicating formation of hydrochloric acid or a weaker base than ammonia.

1. $NH_4Cl + CH_2O \rightarrow H_2C=NH + HCl + H_2O$

This is analogous to the reaction of formaldehyde and hydroxylamine hydrochloride.

2. $NH_2OH \cdot HCl + CH_2O \rightarrow H_2C=NOH + HCl + H_2O$

While little is known of formaldimines in general, imine structures are noted for their instability and for their high reactivity.

It has been found that by carefully controlling the conditions of the reaction, simple intermediate N-(2-thenyl)formaldimines can be conveniently produced. The conditions vary with the reactivity of the thiophene compound in question, and therefore the discussion will be divided into (A) thiophene, and (B) 2-methylthiophene.

(A) Thiophene

It has been found that when formaldehyde and ammonium chloride are stirred together at room temperature for a period of not longer than thirty minutes, the thiophene added, and the mixture slowly warmed to 68 to 70 degrees centigrade to initiate reaction, the source of heat immediately removed, and the temperature allowed to fall to ambient temperatures while the reaction is vigorously stirred, the chief products of the reaction are N-(2-thenyl)formaldimine,

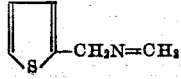

and polymers thereof. It will be shown under (B) that the reactivity of these compounds is such as to account for polymerization of simple thiophene amines with this compound to produce resins.

It is to be noted that in the application for United States Letters Patent Serial No. 636,511, filed December 21, 1945, now abandoned, in the names of Howard D. Hartough and Sigmund J. Lukasiewicsz these inventors described the production of 2-thenylamine and di-(2-thenyl)-amine by mixing all reactants, i. e. thiophene, ammonium halide and formaldehyde in contrast to the procedure described hereinbefore.

(B) 2-methylthiophene

When 2-methylthiophene, formaldehyde and ammonium halide are reacted at a temperature not exceeding 56 degrees centigrade, a new compound having the empirical formula $C_7H_9SN$ can be isolated from the products of the reaction. Treatment of this compound with hot, dilute aqueous hydrogen chloride causes evolution of formaldehyde. Treatment of this compound with 2-methylthiophene and dilute aqueous hydrogen chloride yields a crystalline compound having a melting point of 217 to 218 degrees centigrade, which when mixed and melted with an authentic sample of di-(5-methyl-2-thenyl)-amine hydrochloride caused no depression of the melting point of the authentic sample. On the basis of the foregoing reactions, the compound having the empirical formula $C_7H_9SN$ has been assigned the following structure:

N-(5-methyl-2-thenyl)formaldimine

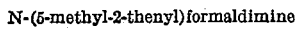

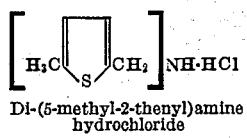
Di-(5-methyl-2-thenyl)amine hydrochloride

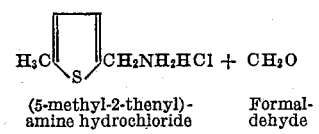
(5-methyl-2-thenyl)- Formaldehyde amine hydrochloride

The compound was found to react with aniline in dilute hydrochloric acid solution, and with urea in phosphoric acid solution.

Illustrative of conditions for the formation of formaldiamines are the following non-limiting examples.

Example I

A mixture of about 2 moles of formaldehyde as an aqueous 36 per cent solution and about 2 moles of ammonium chloride was stirred at room temperature (about 25 degrees centigrade) for about 30 minutes. (Other ammonium halides, NH₄Br and NH₄I may be used.) Upon mixing the two reactants a negative heat of solution was noted and the temperature fell to 15° C. and slowly rose to 23° C. About 2 moles of thiophene were then added and the reaction mixture stirred for one hour without any apparent reaction. The temperature was then raised by increments of 10 degrees and no reaction was observed until the temperature of the reaction mixture reached about 70° C. At this temperature the source of external heat was removed and the reaction mixture stirred for about 3 hours until the reaction temperature fell to room temperature. The aqueous layer was decanted from the thiophene layer which represented about 1.3 moles of thiophene. Accordingly, about 0.7 mole of thiophene had reacted. The aqueous layer was neutralized with aqueous 40 weight per cent sodium hydroxide solution, the light yellow oil so freed dissolved in benzene and filtered, the benzene removed by distillation and the residue subjected to distillation at reduced pressure. A distillate having a boiling range of 100–200° C. at 4 millimeters of mercury pressure was obtained. The distillate was a viscous, light yellow, oil that was semi-solid when cooled. When the distillate was treated with hot dilute aqueous hydrogen chloride formaldehyde was evolved freely. The still residue after heating to 225° C. (pot temperature) during distillation, was light red in color, fluid and soluble in benzene. The distillate contained 24.85 per cent sulfur and 10.97 per cent nitrogen and has been assigned the formula

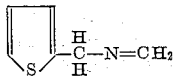

N-(2-thenyl)formaldimine, for which the calculated sulfur and nitrogen content is respectively 25.60 per cent and 11.20 per cent.

The nitrogen content of the still residue was 7.76 per cent.

While the foregoing procedure gives satisfactory results it is not essential to follow the detailed operations set forth in Example I. The critical procedure, distinguishing from that described in application Serial No. 636,511, is that the mixture of thiophene, ammonium halide and formaldehyde is warmed to 68° to 70° C. and held at that temperature by any suitable means of external cooling such as an ice bath until the heat of reaction has subsided. The temperature of the reaction mixture is then allowed to drop to ambient temperature (15°–30° C.) instead of refluxing the reaction mixture as described in application Serial No. 636,511. Refluxing of the reaction mixture yields 2-thenylamine, di-(2-thenyl)amine and high polymers whereas maintenance of temperatures of 15°–30° C. leads to the production of the formaldimine.

Example II

About 0.1 mole of concentrated hydrochloric acid was added to about 0.1 mole of 2-thenylamine in aqueous solution. To the solution of 2-thenylamine hydrochloride thus prepared was added about 0.15 mole of formaldehyde as an aqueous 36 per cent solution. The reaction mixture was maintained at about 25° C. for about 2 hours, warmed to 40° C., held at that temperature for about 30 minutes, cooled, neutralized with caustic soda and the formaldimine recovered as in Example I. This product had a sulfur content of 24.77 per cent as compared to a sulfur content of 25.60 per cent for N-(2-thenyl)formaldimine.

Example III

About 20 moles of formaldehyde as an aqueous 36 per cent formalin solution and about 20 moles of ammonium chloride were mixed. The mixture so formed was stirred for about 30 minutes at about 25° C., and 10 moles of thiophene added. The reaction mixture was then warmed to 70° C., and the external source of heat removed. The reaction temperature was held at 70° C. by external cooling. After stirring for about 5 hours, the mixture was cooled to about 10° C., and the solid ammonium chloride removed. The remainder of the reaction mixture formed 2 layers; an upper layer of thiophene and a lower aqueous layer.

The thiophene layer was distilled and about 34 parts by weight of still residue recovered. About 26.5 per cent of the still residue was 2-thenylalcohol having a boiling point of 36–39° C. and a pressure of 0.9 millimeter mercury and a refractive index of $n_D^{20}$ 1.5280 and about 23.5 per cent was di-(2-thienyl)methane

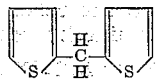

having a boiling point of 95–102 degrees centigrade, at a pressure of 1 millimeter of mercury and a refractive index of $n_D^{20}$ 1.5649.

An aliquot portion of the aqueous layer was neutralized with aqueous sodium hydroxide and extracted with benzene. The benzene was then removed by evaporation and a product containing a small amount of benzene obtained. Distillation of this product yielded about 34.8 per cent (based upon the thiophene used) of N-(2-thenyl)formaldimine having a boiling point of 100–121° C., at a pressure of 3.7 millimeters of mercury and a refractive index above $n_D^{20}$ 1.595. (The product was too viscous for a more accurate determination.)

Example IV

Example III was repeated under the same conditions except that the reaction temperature was not allowed to rise above 65° C.

Example V

Example III was again repeated with the following change, i. e. after initiating the reaction at 65–68° C., the temperature was lowered to 55° C., and maintained below that temperature throughout the reaction period of about 5 hours. This produced a reaction mixture of vastly improved color, i. e. a pale yellow color.

Example VI

A well-stirred mixture of about 980 parts by weight of 2-methylthiophene (about 10 moles), 850 parts by weight of an aqueous 36 per cent solution of formaldehyde (about 10 moles), and about 815 parts by weight of ammonium chloride (about 15 moles) was warmed to 40° C. The external source of heat was removed and the reaction temperature was allowed to rise to 55° C. and held at that temperature by external cooling. The di-(5-methyl-2-thenyl)amine hydrochloride was filtered off, washed with benzene, and the crystals neutralized with aqueous caustic soda solution to obtain the free base. The 5-methyl-2-thenylamine thus obtained was distilled. A yield of 369 parts by weight having a boiling point of 170-171° C. at a pressure of 8 millimeters and a refractive index of 1.5808 was obtained together with a still residue of about 50 parts by weight. Upon evaporation of the benzene washings of the amine hydrochloride, about 76 parts by weight of di-(5-methyl-2-thienyl) methane,

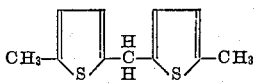

was obtained.

Neutralization of the aqueous filtrate produced by the separation of the amine hydrochloride crystals from the reaction mixture followed by extraction of the neutralized filtrate with benzene, distillation of the benzene and distillation of the reaction products in vacuum produced the following products:

| Product | Pts. by Weight | Boiling Point |
| --- | --- | --- |
| 5-methyl-2-thenylalcohol | 11 | 42-47° C., @ 6 mm. Hg. |
| 5-methyl-2-thenylamine | 44 | 80-85° C., @ 6 mm. Hg. |
| N-(5-methyl-2-thenyl)formaldimine | [1] 134 | 128-133° C., @ 4 mm. Hg. |
| di-(5-methyl-2-thienyl)amine [2]. | 70 | 159° C., 4 mm. |
| Residue | 145 | |

[1] Recrystallized from alcohol, melting point 83.5-84.5° C.
[2] $n_D^{20}$ 1.5808.

Treatment of the N-(5-methyl-2-thenyl)-formaldimine with hot dilute aqueous hydrochloric acid caused evolution of formaldehyde.

N-(5-methyl-2-phenyl)formaldimine $C_7H_9SN$, 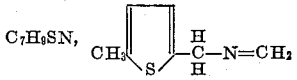

| | Per Cent Carbon | Per Cent Hydrogen | Per Cent Nitrogen | Per Cent Sulfur |
| --- | --- | --- | --- | --- |
| Found | 61.02 | 6.32 | 10.07 | 22.73 |
| Calculated | 60.44 | 6.47 | 10.07 | 23.02 |

When the foregoing product, $C_7H_9SN$ is reacted with acetic anhydride in the ASTM test for hydroxyl number, the hydroxyl number is 620.

Example VII

Seven parts by weight of N-(5-methyl-2-thenyl)formaldimine were dissolved in 15 parts by weight of water and 5 parts by weight of hydrochloric acid. The amine hydrochloride thus formed in aqueous solution was vigorously stirred with 5 parts by weight of 2-methylthiophene and heated to 70-75° C. for about 15 minutes and allowed to cool. A white crystalline product was formed which was separated, dried and recrystallized from 35 parts by weight of water. After drying, these crystals melted at 218-219° C. A mixed melting point with an authentic sample of di-(5-methyl-2-thenyl)amine hydrochloride (M. P. 218-219° C.) showed no depression.

Example VIII

Aniline was reacted with the hydrochloride of N-(5-methyl-2-thenyl)formaldimine in the molar ratio of about 1:1 in aqueous solution in a manner similar to that described in Example VII. The product, upon neutralization with aqueous caustic soda, separated from the aqueous solution as an oil that could not be crystallized.

Example IX

About 196 parts by weight of 2-methylthiophene (about 2 moles) and about 108 parts by weight of ammonium chloride (about 2 moles) were mixed and about 4 moles of formaldehyde as an aqueous 36 per cent solution added thereto. The temperature of the mixture fell to about 15° C. and was allowed to return to ambient temperatures (about 25° C.) whilst stirring the reaction mixture. After one hour the temperature had risen to 32° C., indicating the generation of a heat of reaction. The temperature was held at 35-36° C. for about 1.5 hours by means of external cooling. Stirring of the reaction mixture was continued for about one hour longer until the temperature fell to about 30° C. A mass of crystals formed which was filtered off. These crystals were recrystallized from hot water after separating the di-(5-methyl-2-thienyl)methane. The residue was neutralized with aqueous sodium hydroxide, extracted with benzene, the benzene evaporated on a steam bath and the residue subjected to distillation. The N-(5-methyl-2-thenyl)formaldimine distilled at 110-130° C. at a pressure of 6 millimeters of mercury.

Example X

Example IX was repeated using 2 moles each of 2-methylthiophene, formaldehyde (aqueous solution) and ammonium chloride. A 50 per cent yield of di-(5-methyl-2-thenyl)amine hydrochloride together with about 11 parts by weight of benzene-soluble, water insoluble product which had a pleasant alcohol-like odor and contained 5-methyl-2-thenyl alcohol. The filtrate was neutralized with aqueous sodium hydroxide, dissolved in ether, and about 90 per cent of the ether removed by distillation. Alcohol was then added to the solution and the mixture cooled in an ice bath and seeded with crystals of N-(5-methyl-2-thenyl)formaldimine. By this method a 30 per cent yield (based on formaldehyde) of N-(5-methyl-2-thenyl)formaldimine was obtained together with a residue produced upon removal of the ether-alcohol solvent.

Example XI

About one mole of 2-methylthiophene, about one mole of ammonium chloride and about 2 moles of formaldehyde (aqueous solution) were mixed together and the general procedure of Example X followed, with the exception that the temperature was held at 27-30° C. Only 0.14 mole of di-(5-methyl-2-thenyl)amine, 5 parts by weight of benzene-soluble material, 0.19 mole of N-(5-methyl-2-thenyl)formaldimine and 41 parts by weight of residue which crystallized upon further cooling, were obtained.

Example XII

About 10 parts by weight of urea (0.16 mole) were added to about 75 parts by weight of the solution of the reaction mixture obtained in Example III. The clear solution was warmed on the steam bath and crystals quickly began to precipitate. After about 30 minutes the mixture was cooled and filtered. The crystals were digested with hot alcohol, filtered and dried. These crystals gave a positive Beilstein test for chlorine, melted at 235° C. (uncorrected block method), with decomposition, and could not be redissolved in water, alcohol, benzene or chloroform. The product contained 9.28 per cent sulfur, 33.35 per cent nitrogen and 3.7 per cent chlorine.

Example XIII

About 10 parts by weight of styrene (about 0.1 mole) and about 10 parts by weight of N-(5-methyl-2-thenyl)formaldimine (about 0.07 mole) were heated in an open-mouthed container in an oil bath at about 180° to about 200° C. Thermal polymerization took place after about 30 minutes. The product was a light-yellow semifluid, non-tacky polymer that could be drawn into long fibers with ease when slightly warm. The product was thermoplastic and appeared to crystallize to some extent on standing exposed to the air.

Example XIV

About 100 parts by weight of the aqueous reaction product obtained in Example III was added to about 15 parts by weight of styrene and the mixture heated at reflux (87–90° C.) with adequate stirring for 4 hours. When the agitation was stopped, an oily layer separated out. The oily layer was separated by decantation and washed with 10 per cent aqueous sodium hydroxide solution. The washed oil was dissolved in benzene and the benzene evaporated. A dark viscous oil containing 15.76 per cent sulfur and 3.95 per cent nitrogen was obtained.

Example XV

About 10 parts by weight each of styrene and the aqueous reaction product obtained in Example III (free formaldimine) were heated together as in Example XIII for about 8 hours. The resultant copolymer was similar to that described in Example XIII.

Example XVI

About 25 parts by weight of liquid reaction product containing free formaldimine obtained in Example IV was dissolved in about 160 parts by weight of carbon tetrachloride. To the solution about 10 parts by weight of boron trifluoride-etherate was added. The mixture was refluxed for about 2 hours. The product was a hard, brittle resin which could not be dissolved in benzene or other common solvents. Treatment with boiling water failed to change the consistency of the product.

Example XVII

About 8 to 10 parts by weight of N-(2-thenyl)-formaldimine were added to about 5 parts by weight of phenol. A heat of reaction was noted and after warming for about 30 minutes on a steam bath at about 100° C. no odor of phenol could be detected. The product was a viscous yellow oil.

Example XVIII

About 10 parts by weight of aniline were added to about 75 parts by weight of the aqueous reaction mixture obtained in Example III. A precipitate formed immediately and a heat of reaction was noted. The precipitate was resinous and could not be dissolved in any common solvent after being washed and digested in 10 per cent aqueous sodium hydroxide solution. The light red, resinous product had a sulfur content of 6.4 per cent and a nitrogen content of 5.19 per cent.

Example XIX

Bis-2,5-(methyleneiminomethyl)thiophene was prepared in the following manner. About 45 parts by weight of an aqueous 36% solution of formaldehyde (about 0.5 mole of formaldehyde) and about 15 parts by weight of ammonium chloride (about 0.3 mole) were added to about 35 parts by weight of N-(2-thenyl)formaldimine (about 0.3 mole). The mixture so produced was stirred for about one hour at 70° C., cooled to room temperature and extracted with ether. Evaporation of the extract yielded about 8 parts by weight of 2-thiophenealdehyde which was identified as the semicarbazone. The water-soluble amines were obtained by treating the aqueous reaction mixture after extraction with ether with about 11 parts by weight of sodium hydroxide (about 0.25 mole) as a 20% aqueous solution and extracting the aqueous mixture with ether. Evaporation of the ether extract yielded 31 parts by weight of a product which analyzed as follows: nitrogen, 13.63%; sulfur, 21.22%. Since the calculated values for the N-(2-thenyl) formaldimine are nitrogen, 11.20%; sulfur, 25.60%; the observed values represent an increase in the nitrogen concentration and a decrease in the sulfur concentration. However, bis-2,5-(methyleneiminomethyl)thiophene,

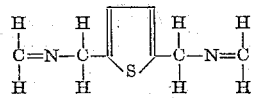

contains 16.93% nitrogen and 19.27% sulfur. The observed values for nitrogen and sulfur indicate that the product obtained by evaporation of the ether extract of the causticized aqueous solution is a mixture of bis-2,5-(methyleneiminomethyl)thiophene and N-(2-thenyl)formaldimine containing about 50 weight per cent of each. Oxidation of a sample of such a mixture with alkaline permanganate gave a mixture of 2-thiophenecarboxylic acid (from the formaldimine) and 2,5-thiophenedicarboxylic acid from the iminomethylthiophene.

Example XX

N-(5-tertiarybutyl-2-thenyl)formaldimine in the form of a trimer has been prepared in a manner analogous to that described hereinbefore by reacting 5-tertiarybutylthiophene, formaldehyde and ammonium chloride with sulfur dioxide gas at 70° C. The product was obtained as a crystalline still residue after topping to remove unreacted 5-tertiarybutylthiophene. The still residue was recrystallized from ethanol. The molecular weight of the recrystallized material was determined by the freezing point method in cyclohexane and found to be 512 (calculated molecular weight for the trimer is 543). Analysis of the recrystallized material yielded the following results:

For $C_{10}H_{15}NS$

|  | Calculated | Found |
|---|---|---|
| Per Cent Carbon | 66.30 | 65.99 |
| Per Cent Hydrogen | 8.28 | 8.28 |
| Per Cent Nitrogen | 7.74 | 7.92 |

In the recovery of N-(2-thenyl)formaldimine by distillation from the reaction mass it has been observed that the product distilled in the anticipated range of the monomeric material but, upon cooling after condensation, it became quite viscous and behaved as a higher molecular weight compound, i. e. a polymer. It was also observed that during distillation it was necessary to superheat the still containing the reaction mass about 60° to 80° C., above the observed boiling point of the monomeric formaldimine. This is indicative of either a highly associated compound or a polymeric material. Redistillation of N-(2-thenyl)formaldimine into a series of fractions gave a series of liquid portions that crystallized in a few weeks to a product that melted at 56° to 56.5° C. and yielded analyses conforming to C₆H₇SN. Thus, it appears that N-(2-thenyl)-formaldimine exists in two forms, a liquid form which consistently has a molecular weight of 256 in boiling benzene (a dimer would have a molecular weight of 250) and a crystalline form having a molecular weight of 368 in boiling benzene and a molecular weight of 381 by the freezing point method in cyclohexane. (The calculated molecular weight for the dimer is 375.) Of course, it is possible that the liquid form is a mixture of monomer and trimer.

It has also been observed that traces of 2-thenylamine inhibit the polymerization of the formaldimine. Several distillations of a sample of N-(2-thenyl)formaldimine yielded a product that polymerized, with an evolution of considerable heat, to a clear solid resin. The polymer depolymerized during a period of about six weeks to a fluid oil having a molecular weight corresponding to a dimer.

Other physical constants of the liquid form of N-(2-thenyl)formaldimine are:

1. Kinematic viscosity in centistokes:

At 100° F., 143.1
   At 130° F., 40.3
   At 210° F., 5.94

2. Density $d\dfrac{90° \text{F.}}{60° \text{F.}} = 1.2026$

3. Molar refractivity
   Found—45.7
   Calculated—43.9

There are many indications that the N-(5-methyl-2-thenyl)formaldimine is a trimer. Thus, for example, the molecular weight, by the freezing point method, in cyclohexane is 401 (calculated for the trimer, 417). On the other hand, the molecular weight in boiling benzene is 343 indicating that at that temperature the material is either a mixture of dimer and trimer or that the material is beginning to depolymerize.

From the foregoing it would appear that the thenyl formaldimines exist as monomers or polymers dependent upon the temperature.

From the foregoing it will be recognized by those skilled in the art that the copolymerization of thenylformaldimines with substances known to co-polymerize or to have active hydrogens has been illustrated. It is to be noted that in the condensations involving thenylformaldimines and substance capable of co-polymerizing or having at least one hydrogen of pronounced reactivity the reaction may be carried out without the addition of a catalyst or in the presence of catalysts of the classes consisting of clays, strong mineral acids such as phosphoric acid, boron trifluoride per se or as a complex etc.

I claim:

1. A method for obtaining bis-2,5-(methyleneiminomethyl)thiophene which comprises reacting N-(2-thenyl)formaldimine, formaldehyde and ammonium halide in substantially equimolecular proportions at about 70 degrees centigrade, to obtain a mixture of thiophenealdehyde, unreacted formaldimine and said 2,5-(methyleneiminomethyl)thiophene, separating said thiophene aldehyde from said reaction mixture, causticizing said reaction mixture, extracting said causticized reaction mixture with a solvent, and evaporating said solvent.

2. Bis-2,5-(methyleneiminomethyl)thiophene.

3. The reaction product at 70 degrees centigrade of equimolecular proportions of N-(2-thenyl)formaldimine, ammonium halide and formaldehyde which reaction product is oxidizable with alkaline permanganate to 2,5-thiophenedicarboxylic acid.

4. Poly-N-(2-thenyl)formaldimine having in the liquid form an average molecular weight in boiling benzene of 250 to 256, a kinematic viscosity at 100 degrees Fahrenheit of 143.1 centistokes, at 130 degrees Fahrenheit of 40.3 centistokes and at 210 degrees Fahrenheit of 5.94 centistokes, a density, $d\dfrac{90° \text{F.}}{60° \text{F.}}$ of 1.2026 and molar refractivity of 45.7, and having in the crystalline form a melting point of 56 to 56.5 degrees centigrade and a molecular weight in boiling benzene of 368 to 375 and a molecular weight of 375 to 381 by the freezing point method in cyclohexane.

5. Poly-N-(5-methyl-2-thenyl)formaldimine having a molecular weight, by the freezing point method, in cyclohexane of about 401 to 417 and a molecular weight in boiling benzene of about 343.

6. Poly-N-(5-tertiary butyl-2-thenyl)formaldimine having a melting point of 106 to 106.5 degrees centigrade, having a molecular weight, by the freezing point method, in cyclohexane of 512 to 543 and containing 65.99 to 66.30 per cent carbon, 8.28 per cent hydrogen and 7.74 to 7.92 per cent nitrogen.

7. A method of preparing an N-(2-thenyl)-formaldimine which comprises mixing ammonium chloride and aqueous formaldehyde, adding a member of the group consisting of thiophene and thiophene having at least one unsubstituted nuclear alpha carbon and not more than three substituents selected from the group consisting of alkyl, aryl, alkaryl, aralkyl and halogens having a molecular weight greater than 38, raising the temperature of the reaction mixture so formed to not exceed about 70° C., holding said reaction mixture at said reaction temperature until the heat of reaction has subsided, lowering the temperature of said reaction mixture to ambient temperature, separating the aqueous layer, neutralizing said aqueous layer to produce free formaldimine and recovering said formaldimine.

8. A method of preparing an N-(2-thenyl)-formaldimine which comprises mixing ammonium chloride and aqueous formaldehyde adding a member of the group consisting of thiophene and thiophene having at least one unsubstituted nuclear alpha carbon and not more than three substituents selected from the group consisting of alkyl, aryl, alkaryl, aralkyl and halogens having a molecular weight greater than 38, raising the temperature of the reaction mixture so formed to that at which a reaction is initiated, holding the temperature of said reaction mixture at said temperature at which a reaction is initiated until the heat of reaction has subsided, lowering the temperature of such reaction mixture to room temperature, separating the aqueous layer, neutralizing said aqueous layer to produce free formaldimine, and recovering said formaldimine.

HOWARD D. HARTOUGH.

REFERENCES CITED

The following references are of record in the file of this patent:

UNITED STATES PATENTS

| Number | Name | Date |
| --- | --- | --- |
| 2,114,121 | Bender | Apr. 12, 1938 |
| 2,453,086 | Caesar | Nov. 2, 1948 |

OTHER REFERENCES

Adams: Organic Reactions, vol. 1, pp. 304, 327, 329, 330 (1942).